(12) United States Patent
Hirakawa et al.

(10) Patent No.: US 9,718,710 B2
(45) Date of Patent: Aug. 1, 2017

(54) TREATMENT APPARATUS AND METHOD FOR REUSING TREATMENT LIQUID

(71) Applicant: Kabushiki Kaisha Toshiba, Minato-ku (JP)

(72) Inventors: Masaaki Hirakawa, Yokohama (JP); Emi Matsui, Kamakura (JP)

(73) Assignee: Kabushiki Kaisha Toshiba, Minato-ku (JP)

( * ) Notice: Subject to any disclaimer, the term of this patent is extended or adjusted under 35 U.S.C. 154(b) by 0 days.

(21) Appl. No.: 14/813,638

(22) Filed: Jul. 30, 2015

(65) Prior Publication Data
US 2016/0075570 A1 Mar. 17, 2016

(30) Foreign Application Priority Data
Sep. 17, 2014 (JP) ................. 2014-188628

(51) Int. Cl.
| | | |
|---|---|---|
| *B44C 1/22* | (2006.01) | |
| *C03C 15/00* | (2006.01) | |
| *C03C 25/68* | (2006.01) | |
| *C23F 1/00* | (2006.01) | |
| *C02F 1/469* | (2006.01) | |
| *B01D 61/24* | (2006.01) | |
| *B01D 61/44* | (2006.01) | |
| *C02F 103/34* | (2006.01) | |

(52) U.S. Cl.
CPC .......... *C02F 1/4693* (2013.01); *B01D 61/243* (2013.01); *B01D 61/44* (2013.01); *B01D 2311/25* (2013.01); *C02F 2103/346* (2013.01); *C02F 2209/02* (2013.01)

(58) Field of Classification Search
CPC .............. C02F 1/4693; C02F 2103/346; C02F 2209/02; B01D 61/44; B01D 2311/25
USPC ........................................................... 216/83
See application file for complete search history.

(56) References Cited

U.S. PATENT DOCUMENTS

| | | |
|---|---|---|
| 2006/0175204 A1 | 8/2006 | Matejat et al. |
| 2008/0087645 A1 | 4/2008 | Izuta et al. |

FOREIGN PATENT DOCUMENTS

| | | |
|---|---|---|
| JP | 2007-157750 | 6/2007 |
| JP | 2008-098444 | 4/2008 |
| JP | 2008-189537 A | 8/2008 |
| JP | 2009-094455 | 4/2009 |
| JP | 2009-130032 | 6/2009 |

(Continued)

OTHER PUBLICATIONS

Combined Taiwanese Office Action and Search Report dated Jul. 1, 2016 in Patent Application No. 104128510 (with English language translation).

*Primary Examiner* — Roberts Culbert
(74) *Attorney, Agent, or Firm* — Oblon, McClelland, Maier & Neustadt, L.L.P.

(57) ABSTRACT

According to one embodiment, a treatment apparatus includes a dialysis unit, a treatment unit and a recovery unit. The dialysis unit is configured to dialyze a solution including a phosphoric acid, a silicon compound, and water. The treatment unit is configured to perform treatment of an object to be treated using a dialyzed solution. The recovery unit is configured to recover a solution used in the treatment of the object to be treated and supply to the dialysis unit. The dialysis unit includes a transmission part which allows anions to be transmitted. The recovery unit supplies the solution used in the treatment of the object to be treated, to a region in the dialysis unit. The region is divided by the transmission part.

4 Claims, 3 Drawing Sheets

(56) References Cited

FOREIGN PATENT DOCUMENTS

| | | |
|---|---|---|
| JP | 2013-021066 | 1/2013 |
| TW | 200520836 A | 7/2005 |
| TW | 200826194 A | 6/2008 |
| TW | 200829517 A | 7/2008 |

TREATMENT APPARATUS AND METHOD FOR REUSING TREATMENT LIQUID

CROSS-REFERENCE TO RELATED APPLICATIONS

This application is based upon and claims the benefit of priority from the Japanese Patent Application No. 2014-188628, filed on Sep. 17, 2014; the entire contents of which are incorporated herein by reference.

FIELD

Embodiments described herein relate generally to a treatment apparatus and a method for reusing treatment liquid.

BACKGROUND

When manufacturing an electronic device, such as a semiconductor device or a flat panel display, etching processing for supplying a treatment liquid and selectively removing a silicon compound is performed on a surface of an object to be treated on which the silicon compound is formed.

In the treatment liquid used in the etching processing, impurities that are made of an inorganic substance or a metal, which are removed from the object to be treated, are included. For this reason, when the etching processing is sequentially performed, the impurities in the treatment liquid after the etching processing is performed are removed, and the treatment liquid is reused. In such a technology of reusing the treatment liquid, it is desirable to further improve efficiency when reusing the treatment liquid.

DETAILED DESCRIPTION

Figure 1:
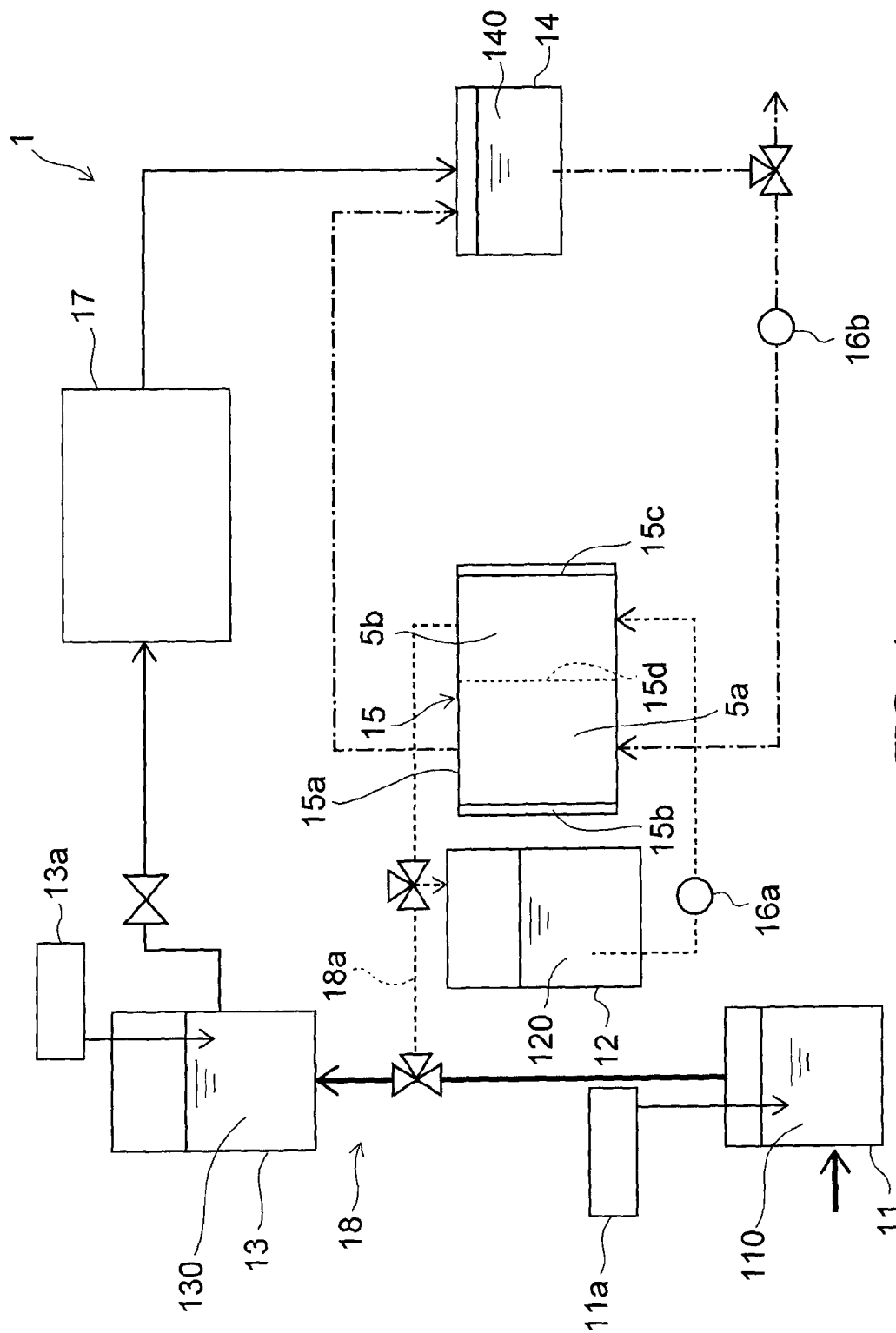
FIG. 1 is a schematic view for illustrating a treatment apparatus according to the embodiment.

According to one embodiment, a treatment apparatus includes a dialysis unit, a treatment unit and a recovery unit. The dialysis unit is configured to dialyze a solution including a phosphoric acid, a silicon compound, and water. The treatment unit is configured to perform treatment of an object to be treated using a dialyzed solution. The recovery unit is configured to recover a solution used in the treatment of the object to be treated and supply to the dialysis unit. The dialysis unit includes a transmission part which allows anions to be transmitted. The recovery unit supplies the solution used in the treatment of the object to be treated, to a region in the dialysis unit. The region is divided by the transmission part.

Hereinafter, each embodiment of the invention will be described with reference to the drawings.

In addition, the drawings are schematic or conceptual, and a relationship between a thickness and a width of each part, and ratio of size between parts, are not necessarily the same as the real relationship and ratio. In addition, even when the same parts are illustrated, there is a case where the dimension or the ratio is illustrated differently according to the drawings.

In addition, in this specification and each drawing, similar elements to the elements which are already described in previous drawings will be given the same reference numerals, and the detail description thereof will be omitted.

[Embodiment]

FIG. 1 is a schematic view for illustrating a treatment apparatus according to the embodiment.

As illustrated in FIG. 1, a treatment apparatus 1 includes a tank 11, a tank 12 (first supply unit), a tank 13 (second supply unit), a recovery unit 14, a dialysis unit 15, a temperature control unit 16a (first temperature control unit), a temperature control unit 16b (second temperature control unit), a treatment unit 17, and a pipe member 18. The treatment apparatus 1 may include a control unit for controlling operations of the recovery unit 14 or the like. The control unit can be, for example, a control device provided with a central processing unit (CPU) or the like.

The tank 11 stores a solution 110. The solution 110 is a source liquid of a treatment liquid 130 which will be described later. The tank 11 includes a concentration meter 11a.

Here, when manufacturing an electronic apparatus, such as a semiconductor apparatus or a flat panel display, on a surface of an object to be treated (for example, a substrate) on which a silicon nitride film ($Si_3N_4$) and a silicon oxide film ($SiO_2$) are formed, etching processing for supplying a phosphoric acid aqueous solution having a high temperature (150° C. to 160° C.) as the treatment liquid, and for selectively removing the silicon nitride film, is performed. In this manner, as the solution 110, a phosphoric acid ($H_3PO_4$) aqueous solution is used.

For selectively etching the silicon nitride film formed on the surface of a semiconductor wafer, it is desirable that the concentration of a phosphoric acid with respect to the total weight of the solution 110 is within a range of 80% by weight to 90% by weight.

After etching the silicon nitride film by using the phosphoric acid aqueous solution having a high temperature, a silicon compound is dissolved and the silicon concentration in the phosphoric acid aqueous solution increases. When the silicon concentration in the phosphoric acid aqueous solution after performing the etching processing plural times without changing the solution exceeds a saturated concentration, the impurities including silicon oxide are extracted. When the impurities including the silicon oxide in the phosphoric acid aqueous solution are extracted, a problem in that the impurities are attached to the substrate or a treatment tank of the treatment unit 17, or that a filter is clogged, occurs.

As described above, the solution 110 can be, for example, a solution including a phosphoric acid and water.

The tank 12 stores a solution 120. The solution 120 is, for example, water ($H_2O$). The solution 120 may be a solution including a phosphoric acid and water. For example, the solution 120 is a diluted phosphoric acid. The solution 120 may be circulated between the dialysis unit 15 and the tank 12 by using a three-way valve.

The tank 13 stores the treatment liquid 130. The treatment liquid 130 includes the solution 110 supplied to the tank 13 from the tank 11. The treatment liquid 130 can include the solution 120. The solution 120 includes a production liquid (regeneration liquid) produced by electrodialyzing a solution 140 using the dialysis unit 15. For example, the production liquid is a solution which includes a phosphoric acid and water, and is supplied to the tank 13 via a pipe 18a.

For example, the tank 13 is a tank which stores the phosphoric acid aqueous solution supplied to the tank 13 from the tank 11, and the phosphoric acid aqueous solution produced by electrodialysis of the dialysis unit 15. The treatment liquid 130 can include the phosphoric acid aqueous solution supplied from the tank 11, and the phosphoric acid aqueous solution produced due to the electrodialysis of the dialysis unit 15.

In the tank 13, a concentration meter 13a is provided. Based on the output of the concentration meter 13a, the concentration of the treatment liquid 130 stored in the tank 13 becomes appropriate. For selectively etching the silicon nitride film, it is desirable that the concentration of the phosphoric acid with respect to the total weight of the treatment liquid 130 is within a range of 80% by weight to 90% by weight.

For example, based on the output of the concentration meter 13a, a mixing ratio between the solution 110 supplied from the tank 11 and the production liquid produced by the electrodialysis of the dialysis unit 15 is obtained. Based on this ratio, an amount of the solution 110 supplied to the tank 13 from the tank 11 is obtained. By obtaining an amount of the production liquid based on this ratio, the amount of the solution 120 supplied from the tank 12 is controlled, and the concentration or the like of the treatment liquid 130 becomes appropriate.

In order to set the concentration of the treatment liquid 130 stored in the tank 13 to be appropriate, evaporation of the moisture may be performed by heating the production liquid produced by the electrodialysis of the dialysis unit 15. In other words, when the concentration of the production liquid produced by the electrodialysis of the dialysis unit 15 is lower than the appropriate concentration (for example, concentration within the range of 80% by weight to 90% by weight), evaporation of the moisture is performed by heating the production liquid. Accordingly, it is possible to set the concentration of the treatment liquid 130 including the solution 110 supplied to the tank 13 from the tank 11 and the production liquid supplied to the tank 13 after being heated, to be appropriate. In this case, for example, the pipe 18a can be provided with a concentration meter which measures the concentration of the production liquid, and a temperature control unit (third temperature control unit) including a heating device that heats the production liquid according to the measurement result of the concentration meter.

The recovery unit 14 stores the solution 140. The solution 140 is a solution used in treatment of the object to be treated. For this reason, in the solution 140, the impurities made of the silicon oxide or the metal, are included. In addition, in the solution 140, a reusable component is included.

For this reason, by circulating the solution 140 between the dialysis unit 15 and the recovery unit 14, the reusable component included in the solution 140 is recovered by the electrodialysis of the dialysis unit 15.

The dialysis unit 15 recovers the reusable component of the solution 140 by the electrodialysis. In other words, the dialysis unit 15 recovers the phosphoric acid by the electrodialysis using the solution 120 and the solution 140. In addition, the dialysis unit 15 controls the impurities included in the solution 140 so as not to be incorporated into the recovered component.

The dialysis unit 15 will be described later in detail.

Based on the output from a temperature sensor which is not illustrated, the temperature control unit 16a controls the temperature of the solution 120 in a second chamber 5b of the dialysis unit 15. For example, the temperature control unit 16a can be provided with a cooling device or a heating device.

The temperature control unit 16a can be provided, for example, between the tank 12 and the dialysis unit 15. In this case, by controlling the temperature of the solution 120 supplied to the dialysis unit 15, the temperature control unit 16a controls the temperature of the solution 120 in the second chamber 5b. The temperature control unit 16a can be provided, for example, in a second electrode 15c or a container 15a of the dialysis unit 15. In this case, the temperature control unit 16a controls the temperature of the solution 120 in the second chamber 5b via the second electrode 15c or the container 15a.

In the second chamber 5b, the temperature control unit 16a controls the temperature of the solution 120 in order to promote the electrodialysis. For example, the temperature control unit 16a controls the temperature of the solution 120 in order to promote the reaction between a hydrogen ion ($H^+$) and a dihydrogen phosphate ion ($H_2PO_4^-$), in the second chamber 5b. In other words, the temperature control unit 16a controls the temperature of the solution 120 in order to promote the production of the phosphoric acid. For example, the temperature control unit 16a controls the temperature of the solution 120 in the second chamber 5b to be equal to or greater than 80° C. In this manner, the production efficiency of the phosphoric acid is improved, and the extraction of the silicon compound (for example, the silicon nitride) in the treatment liquid 130 which includes the solution 110 and the production liquid, is suppressed.

Based on the output from the temperature sensor which is not illustrated, the temperature control unit 16b controls the temperature of the solution 140 in a first chamber 5a. For example, the temperature control unit 16b can be provided with the cooling device or the heating device.

The temperature control unit 16b can be provided, for example, between the recovery unit 14 and the dialysis unit 15. In this case, by controlling the temperature of the solution 140 supplied to the first chamber 5a, the temperature control unit 16b controls the temperature of the solution 140 in the first chamber 5a.

The temperature control unit 16b can also be provided, for example, in a first electrode 15b or the container 15a of the dialysis unit 15. In this case, the temperature control unit 16b controls the temperature of the solution 140 in the first chamber 5a via the first electrode 15b or the container 15a.

In the first chamber 5a, the temperature control unit 16b controls the temperature of the solution 140 in order to promote the electrodialysis. For example, in the first chamber 5a, the temperature control unit 16b controls the temperature of the solution 140 in order to separate the phosphoric acid into hydrogen ions and dihydrogen phosphate ions, and to move the dihydrogen phosphate ions to the second chamber 5b from the first chamber 5a via a transmission part 15d. For example, the temperature control unit 16b controls the temperature of the solution 140 in the first chamber 5a to be equal to or greater than 80° C.

Between the recovery unit 14 and the dialysis unit 15, the concentration meter of the silicon oxide or an in-solution particle counter, may be provided.

The treatment unit 17 performs the treatment of the object to be treated using the treatment liquid 130 supplied from the tank 13. The treatment unit 17 is not particularly limited if supplying the treatment liquid 130 onto the surface of the object to be treated. For example, the treatment unit 17 performs the etching processing on the surface or the like of the semiconductor wafer using the treatment liquid 130 as the etching liquid.

For example, the treatment unit 17 can be a spin type device which supplies the treatment liquid 130 onto the surface of the rotating object to be treated. Alternatively, for example, the treatment unit 17 can be a batch type device which dips a plurality of objects to be treated in the treatment liquid 130 at once.

The tank 11, the tank 12, the tank 13, the recovery unit 14, the dialysis unit 15, and the treatment unit 17 are connected to each other by the pipe member 18.

In this case, the solution 140 can be circulated between the recovery unit 14 and the dialysis unit 15 (first chamber 5a). In addition, by the pipe 18a, the production liquid produced by the electrodialysis of the dialysis unit 15 is supplied to the tank 13 from the dialysis unit 15 (second chamber 5b). The solution 120 may be able to be circulated between the tank 12 and the dialysis unit 15 (second chamber 5b) by the pipe 18a.

The pipe member 18 can include, for example, a pipe, a three-way valve, an opening and closing valve, and a solution feeding pump which is not illustrated. Since a known technology can be employed in the pipe member 18, the detailed description thereof will be omitted.

Hereinafter, the dialysis unit 15 will be further described.

Figure 2:
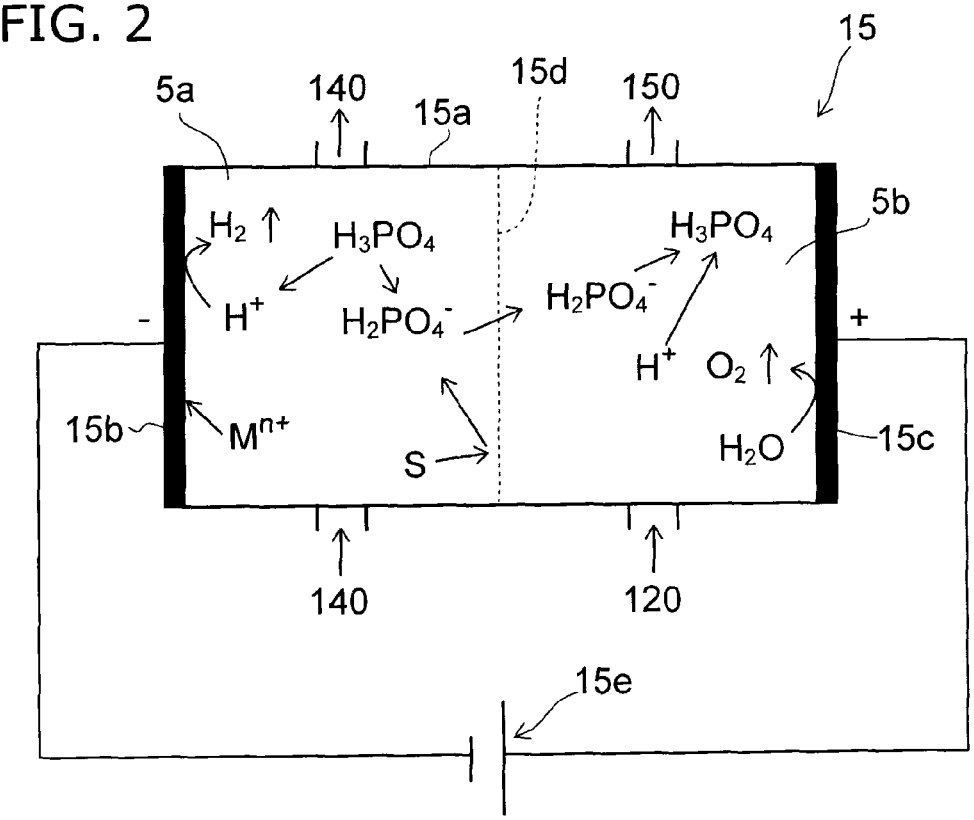
FIG. 2 is a schematic view illustrating a dialysis unit.

FIG. 2 is a schematic view illustrating the dialysis unit.

Figure 3:
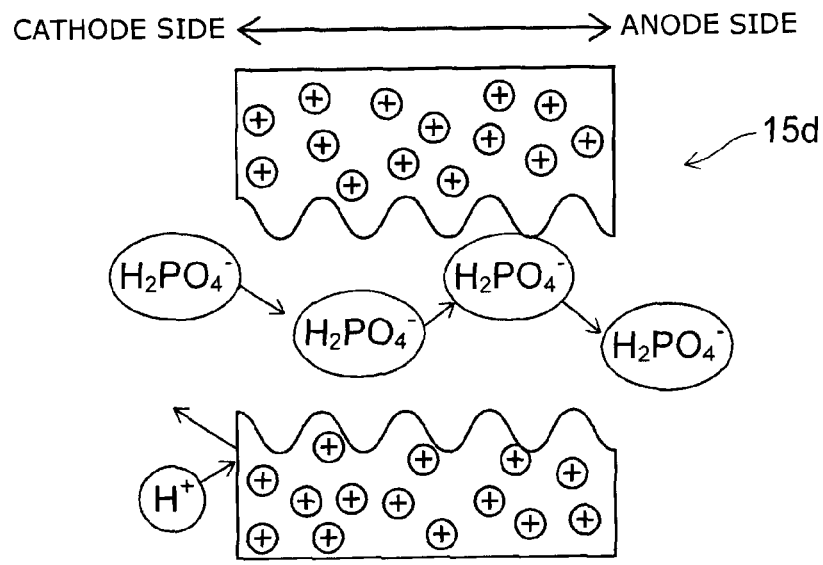
FIG. 3 is a schematic view illustrating a part of the dialysis unit.

FIG. 3 is a schematic view illustrating a part of the dialysis unit.

In FIG. 2, the state of the electrodialysis of the dialysis unit 15 is illustrated. In FIG. 3, the enlarged transmission part 15d is illustrated.

As illustrated in FIG. 2, the dialysis unit 15 includes the container 15a, the first electrode 15b, the second electrode 15c, the transmission part 15d, and a power supply 15e.

The container 15a has a fluid-tight structure. The first electrode 15b is exposed to the inside of the container 15a (first chamber 5a). The first electrode 15b is in contact with the solution 140 on the inside of the container 15a. A cathode side of the power supply 15e is connected to the first electrode 15b. A negative voltage is applied to the first electrode 15b. The first electrode 15b is a cathode electrode.

The second electrode 15c is exposed to the inside of the container 15a (second chamber 5b). The second electrode 15c is in contact with the solution 120 on the inside of the container 15a. An anode side of the power supply 15e is connected to the second electrode 15c. A positive voltage is applied to the second electrode 15c. The second electrode 15c is an anode electrode.

A material of the first electrode 15b and the second electrode 15c is, for example, platinum (Pt). The material of the first electrode 15b and the second electrode 15c can include glassy carbon, conductive diamond which is doped with boron, phosphorus, nitrogen, or the like, etc.

The transmission part 15d is provided on the inside of the container 15a. The transmission part 15d allows anions to be transmitted. The transmission part 15d can be, for example, an anion transmission film. A chamber between the transmission part 15d and the first electrode 15b is the first chamber 5a. A chamber between the transmission part 15d and the second electrode 15c is the second chamber 5b. The transmission part 15d is a diaphragm which partitions the first chamber 5a and the second chamber 5b.

The first chamber 5a is a first region provided between the first electrode 15b and the transmission part 15d. The second chamber 5b is a second region provided between the second electrode 15c and the transmission part 15d. Any of the first chamber 5a and the second chamber 5b is a region in the dialysis unit 15 that is divided by the transmission part 15d.

The container 15a includes an introduction port which introduces the solution 140 to the first chamber 5a, and a discharge port which discharges the solution 140 from the first chamber 5a. The container 15a includes an introduction port which introduces the solution 120 to the second chamber 5b, and a discharge port which discharges a production liquid 150 from the second chamber 5b.

The power supply 15e can be a direct-current power supply.

Hereinafter, operations of the dialysis unit 15 will be described.

The solution 140 stored in the recovery unit 14 is supplied to the first chamber 5a. As described above, the solution 140 includes the impurities which are made of an inorganic substance S such as the silicon oxide, or a metal M, and the reusable component.

For example, when the treatment liquid 130 is a solution which includes a phosphoric acid and water, the solution 140 which is a solution used in the treatment of the object to be treated includes a hydrogen ion, a dihydrogen phosphate ion, and impurities.

The metal M which is a part of the impurities is included as a metal M ion ($M^{n+}$) in the solution 140. In addition, when the inorganic substance S which is a part of the impurities includes silicon oxide, the silicon oxide is included as a particle in the solution 140. For example, according to the reaction illustrated in the following formulas (1) and (2), the silicon dioxide included in the solution 140 is produced from silicon nitride.

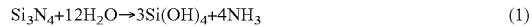

$$Si_3N_4 + 12H_2O \rightarrow 3Si(OH)_4 + 4NH_3 \quad (1)$$

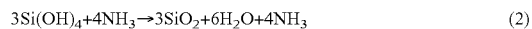

$$3Si(OH)_4 + 4NH_3 \rightarrow 3SiO_2 + 6H_2O + 4NH_3 \quad (2)$$

The solution 120 stored in the tank 12 is supplied to the second chamber 5b. As described above, the solution 120 is, for example, water.

The negative voltage is applied to the first electrode 15b. For this reason, the hydrogen ions in the first chamber 5a are electrolyzed and hydrogen ($H_2$) is produced. In addition, the metal M ions are attracted to the first electrode 15b side.

The positive voltage is applied to the second electrode 15c. For this reason, the water in the second chamber 5b is electrolyzed and oxygen ($O_2$) is produced. In addition, the dihydrogen phosphate ions in the first chamber 5a are attracted to the second electrode 15c side. The dihydrogen phosphate ions to be attracted transmit the transmission part 15d, and are introduced to the second chamber 5b.

As illustrated in FIG. 3, the transmission part 15d allows the dihydrogen phosphate ions which are anions to be transmitted, and does not allow the hydrogen ions or the like which are cations to be transmitted. For this reason, the cations, such as the hydrogen ions, are not introduced to the second chamber 5b, and stay in the first chamber 5a. In addition, since the inorganic substance S, such as the silicon oxide, has the shape of a particle, the inorganic substance S can not transmit the transmission part 15d. Accordingly, the inorganic substance S is not introduced to the second chamber 5b, and stays in the first chamber 5a.

The dihydrogen phosphate ions, which transmit the transmission part 15d and are introduced to the second chamber 5b, react with the hydrogen ions in the solution 120, and produce the phosphoric acid. In other words, according to the reaction illustrated in the following formula (3), the phosphoric acid is produced.

$$H^+ + H_2PO_4^- \rightarrow H_3PO_4 \quad (3)$$

The produced phosphoric acid is supplied to the tank 13 via the pipe 18a as the production liquid 150. For example, when the solution 120 is circulated between the tank 12 and the dialysis unit 15 (second chamber 5b) by the pipe 18a, the solution 120 is circulated until the concentration of the phosphoric acid in the production liquid 150 is within a predetermined range. In this case, when the concentration of the phosphoric acid exceeds the predetermined range, it is possible to supply the produced phosphoric acid to the tank 13.

Accordingly, the phosphoric acid in the solution 140 stored in the recovery unit 14 is reused.

Meanwhile, the impurities made of the inorganic substance S or the metal M stay in the first chamber 5a. In addition, the impurities in the first chamber 5a are fed to the recovery unit 14, and as necessary, are discharged to the outside via the three-way valve or the like. For example, when the concentration meter is provided between the recovery unit 14 and the dialysis unit 15, and the concentration of the impurities exceeds the predetermined concentration, the impurities may be discharged to the outside.

By supplying the solution 120 between the dialysis unit 15 and the tank 12, circulating the solution 140 between the dialysis unit 15 and the recovery unit 14, and performing the above-described electrodialysis, it is possible to remove the impurities, and to repeatedly reuse the phosphoric acid.

The dialysis unit 15 performs the electrodialysis, but may perform diffusion dialysis. For example, the dialysis unit 15 can perform the diffusion dialysis using the transmission part 15d, and a difference in concentration between the solution 140 in the first chamber 5a and the solution 120 in the second chamber 5b.

Here, when etching the surface of the object to be treated on which the silicon nitride film and the silicon oxide film are formed, in an etching liquid after the etching processing, there is a possibility that the inorganic substance, such as the silicon oxide, will be produced after the processing, and the metal will be incorporated after the processing. There is a case where such impurities cause dust. It is necessary to change the phosphoric acid aqueous solution after the etching processing every predetermined period so that the concentration of the silicon dioxide is settled within a certain range in consideration of etching selectivity with respect to the silicon nitride film.

The treatment apparatus 1 in the embodiment includes the dialysis unit 15 between the tank 13 which stores the treatment liquid 130 for the treatment of the object to be treated, and the recovery unit 14 that recovers and stores the solution 140 used in the treatment of the object to be treated. In addition, in the treatment apparatus 1, the dialysis unit 15 circulates the solution 140 between the dialysis unit 15 and the recovery unit 14 to remove the impurities in the solution 140, produces the production liquid 150, and supplies the production liquid 150 to the tank 13. As the dialysis unit 15 is provided in the treatment apparatus 1, it is possible to produce the production liquid 150 in which the impurities are removed, and to repeatedly reuse the treatment liquid 130. In addition, since it is not necessary to separately provide a capturing device or the like which captures the impurities, a complicated configuration of the treatment apparatus 1 is suppressed and cost is reduced.

According to the embodiment, it is possible to provide a treatment apparatus which can improve the efficiency of reusing the treatment liquid.

Figure 4:
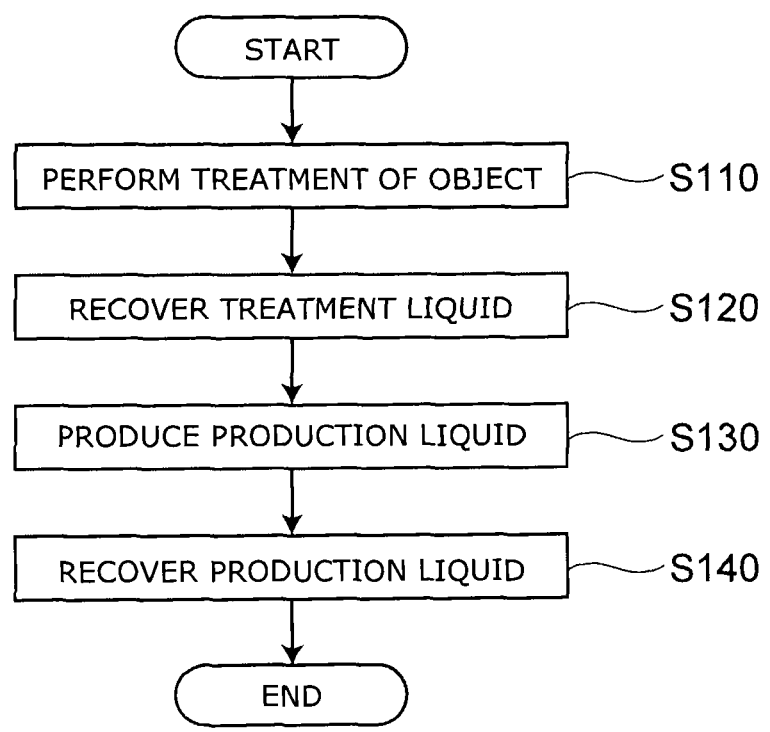
FIG. 4 is a flow chart illustrating a method for reusing treatment liquid according to the embodiment.

FIG. 4 is a flow chart illustrating a method for reusing treatment liquid according to the embodiment.

The method for reusing the treatment liquid is performed by the treatment apparatus 1.

The treatment liquid 130 is fed to the treatment unit 17 from the tank 13, and the treatment (for example, the etching or the like) of the object to be treated is performed (step S110). The treatment liquid 130 is a first solution, and for example, is a solution including a phosphoric acid and water.

The solution 140 used in the treatment of the object to be treated is recovered and stored in the recovery unit 14 (step S120). The solution 140 is a second solution. In other words, the treatment liquid 130 after the treatment of the object to be treated is recovered.

The solution 140 is fed to the first chamber 5a of the dialysis unit 15 from the recovery unit 14, the solution 120 is fed to the second chamber 5b of the dialysis unit 15 from the tank 12, and the reusable component of the solution 140 is recovered (step S130). For example, the solution 120 is supplied between the dialysis unit 15 and the tank 12, the solution 140 is supplied between the dialysis unit 15 and the recovery unit 14, and by performing the electrodialysis, the phosphoric acid in which the impurities are removed is produced as the production liquid 150. The production liquid 150 is a third solution. The solution 120 is a fourth solution.

The recovered reusable component is fed to the tank 13, and is stored in the tank 13 as at least a part of the treatment liquid 130 (step S140). For example, the phosphoric acid in which the impurities are removed is recovered to the tank 13 as the production liquid 150.

The solution 140 is circulated between the recovery unit 14 and the dialysis unit 15 so that the impurities are removed, and at least a part of the treatment liquid 130 is produced as the production liquid 150 and is supplied to the tank 13. Accordingly, it is possible to produce the production liquid 150 in which the impurities are removed, and to repeatedly reuse the treatment liquid 130.

According to the embodiment, it is possible to provide the method for reusing the treatment liquid which can improve the efficiency of reusing the treatment liquid.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions. Moreover, above-mentioned embodiments can be combined mutually and can be carried out.

What is claimed is:

1. A method for reusing treatment liquid, comprising:
   performing treatment of an object to be treated using a first solution including a phosphoric acid and water, said object including a silicon compound;
   recovering a second solution used in the treatment of the object to be treated, said second solution including a silicon compound; and
   dialyzing the second solution so as to separate the silicon compound from the second solution and producing a third solution including a phosphoric acid and water,
   in performing the treatment of the object to be treated, the third solution being added to the first solution.

2. The method according to claim 1,
   wherein the second solution is dialyzed by electrodialysis or diffusion dialysis.

3. The method according to claim 1,
wherein the third solution is added to the first solution after reaching a predetermined concentration.

4. The method according to claim 1, further comprising heating the third solution.

\* \* \* \* \*